(12) United States Patent
Tahara et al.

(10) Patent No.: US 9,420,404 B2
(45) Date of Patent: Aug. 16, 2016

(54) INFORMATION PROCESSING SYSTEM, GAME SYSTEM, INFORMATION PROCESSING APPARATUS, OPERATION INSTRUMENT, RECORDING MEDIUM AND INFORMATION PROCESSING METHOD

(71) Applicant: NINTENDO CO., LTD., Kyoto (JP)

(72) Inventors: Akira Tahara, Kyoto (JP); Ryohei Fujita, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 360 days.

(21) Appl. No.: 14/058,882

(22) Filed: Oct. 21, 2013

(65) Prior Publication Data
US 2014/0121023 A1    May 1, 2014

(30) Foreign Application Priority Data

Oct. 30, 2012 (JP) ................................. 2012-238994

(51) Int. Cl.
*A63F 9/24* (2006.01)
*H04W 4/00* (2009.01)
*A63F 13/24* (2014.01)
*A63F 13/2145* (2014.01)

(52) U.S. Cl.
CPC ............... *H04W 4/008* (2013.01); *A63F 13/24* (2014.09); *A63F 13/2145* (2014.09)

(58) Field of Classification Search
CPC ...... G06F 3/0219; G06F 3/023; G06F 1/1632
See application file for complete search history.

(56) References Cited

U.S. PATENT DOCUMENTS

| | | | |
|---|---|---|---|
| 8,944,912 B2* | 2/2015 | Joynes | G06F 3/0219 361/679.11 |
| 2003/0067738 A1 | 4/2003 | Rudd et al. | |
| 2004/0037028 A1 | 2/2004 | Rudd et al. | |
| 2005/0141190 A1 | 6/2005 | Rudd et al. | |
| 2010/0081505 A1* | 4/2010 | Alten | A63F 13/02 463/36 |
| 2011/0292033 A1 | 12/2011 | Umezu et al. | |
| 2012/0133641 A1 | 5/2012 | Umezu et al. | |
| 2012/0133642 A1 | 5/2012 | Umezu et al. | |
| 2012/0142419 A1 | 6/2012 | Muramatsu | |
| 2012/0242807 A1 | 9/2012 | Umezu et al. | |
| 2012/0271967 A1* | 10/2012 | Hirschman | G06F 3/0219 710/8 |

FOREIGN PATENT DOCUMENTS

| | | |
|---|---|---|
| JP | 9-258877 | 10/1997 |
| JP | 10-223090 | 8/1998 |

(Continued)

*Primary Examiner* — Reginald Renwick
(74) *Attorney, Agent, or Firm* — Nixon & Vanderhye P.C.

(57) ABSTRACT

An example system includes an operation instrument having a storage unit storing information and a first short distance radio communication unit performing transmission/reception of data with an information processing device; and an information processing device having an attachment unit to which the operation instrument is attached, a second short distance radio communication unit performing transmission/reception of data with the operation instrument, an information reading unit reading information stored in the storage unit of the operation instrument through the second short distance radio communication unit, and a processing unit performing processing in accordance with read information read by the information reading unit and operation information indicating operation for the operation instrument attached to the attachment unit.

25 Claims, 11 Drawing Sheets

(56) References Cited

FOREIGN PATENT DOCUMENTS

| | | |
|---|---|---|
| JP | 2003-196003 | 7/2003 |
| JP | 2007-059074 | 3/2007 |
| JP | 2012-23712 | 2/2012 |
| JP | 2012-055340 | 3/2012 |

\* cited by examiner

INFORMATION PROCESSING SYSTEM, GAME SYSTEM, INFORMATION PROCESSING APPARATUS, OPERATION INSTRUMENT, RECORDING MEDIUM AND INFORMATION PROCESSING METHOD

CROSS-REFERENCE TO RELATED APPLICATIONS

This application is based upon and claims the benefit of priority of the prior Japanese Patent Application No. 2012-238994, filed on Oct. 30, 2012, the entire contents of which are incorporated herein by reference.

FIELD

The present technique relates to an information processing system, a game system, an information processing device, an operation instrument, a recording medium and an information processing method.

BACKGROUND AND SUMMARY

An information processing device such as a game machine or a mobile phone is provided with an operation unit with one or more buttons, switches or the like for accepting operation by a user. A game machine, for example, is provided with a cross key, an analog stick, an operational push button or the like, to accept operation concerning a movement or an action of a character in a game, or operation concerning various games such as operation for selecting a menu. Furthermore, a mobile phone is, for example, provided with an operational push button on which a number, a letter or the like is written, and with a directional key or an analog stick for, e.g., four or eight directions, to accept operation concerning speaking, electronic mail transmission/reception or the like.

According to an aspect of the embodiment, an information processing system includes an operation instrument to be operated by a user, having a storage unit storing information and a first short distance radio communication unit performing transmission/reception of data with an information processing device; and an information processing device having an attachment unit to which the operation instrument is attached, a second short distance radio communication unit performing transmission/reception of data with the operation instrument, an information reading unit reading information stored in the storage unit of the operation instrument through the second short distance radio communication unit, and a processing unit performing processing in accordance with read information read by the information reading unit and operation information indicating operation for the operation instrument attached to the attachment unit.

The object and advantages of the technique will be realized and attained by means of the elements and combinations particularly pointed out in the claims. It is to be understood that both the foregoing general description and the following detailed description are exemplary and explanatory and are not restrictive of the present technique.

The above and further objects, features, aspects and effects of the present technique will more fully be apparent from the following detailed description with reference to accompanying drawings.

DETAILED DESCRIPTION OF NON-LIMITING EXAMPLE EMBODIMENTS

Embodiments of an information processing system, an information processing device and the like will be described below by taking a game system as an example.

Embodiment 1

Figure 1:
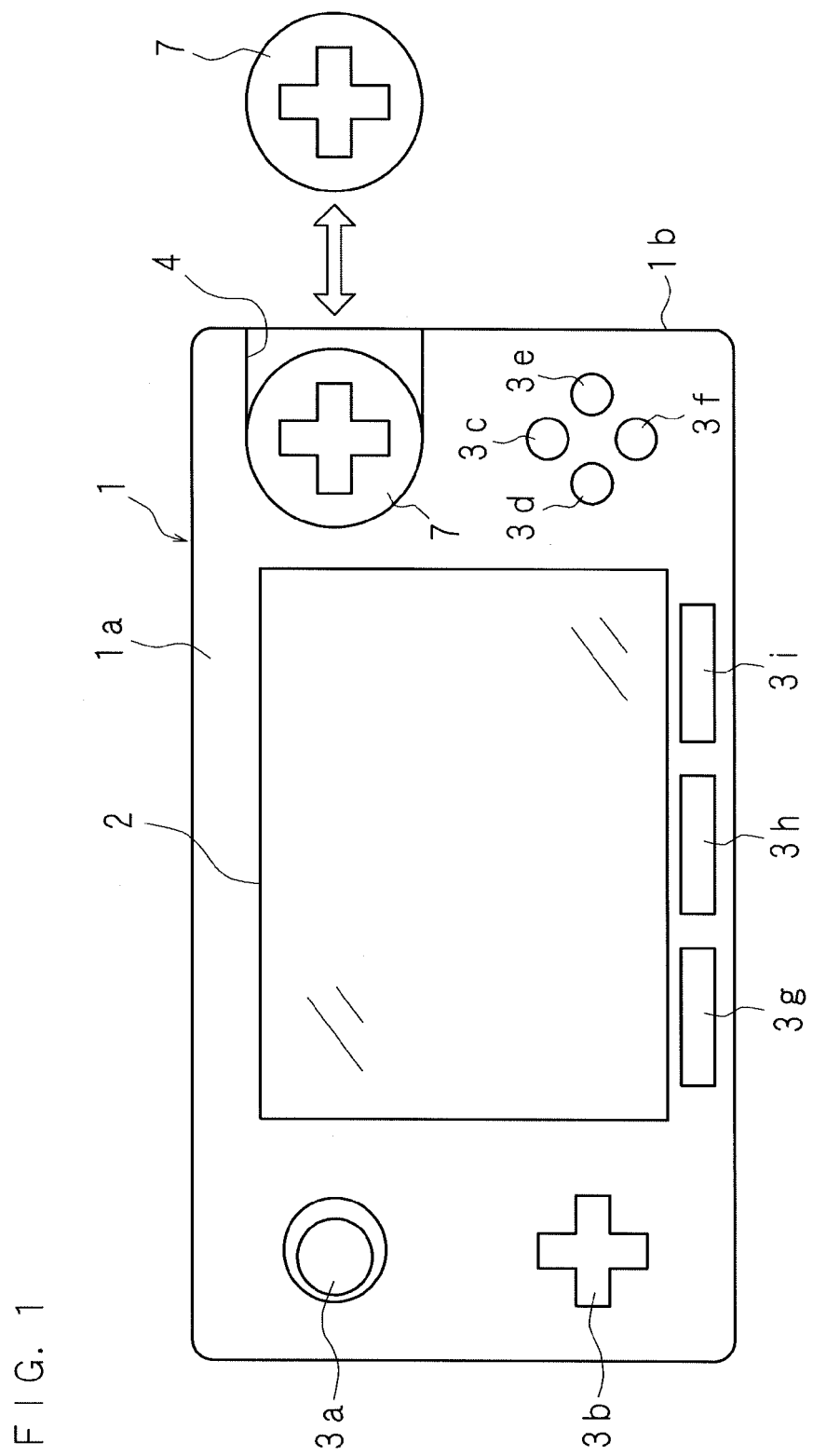
FIG. 1 shows an example non-limiting schematic view illustrating an appearance of a game machine and an operation instrument according to Embodiment 1.

A game system according the present embodiment is constituted by including a portable game machine (information processing device) which may be carried by a user, and one or more operation instruments. FIG. 1 is an example non-limiting schematic view illustrating an appearance of a game machine and an operation instrument according to Embodiment 1. The game machine according to the present embodiment is provided with a housing 1 having a substantially-rectangular board-like shape. A display unit 2 is arranged at the substantial center of a front surface 1a of the housing 1. On the housing 1, an analog stick 3a and a cross key 3b are arranged vertically on the left side of the display unit 2. On the housing 1, in a region on the right side of the display unit 2, an attachment unit 4 to which an operation instrument 7 is attached is arranged at the upper side, and four push buttons 3c to 3f are arranged on the lower side. Each of the four push buttons 3c to 3f has a substantially circular shape and is located to correspond to each apex of a diamond. On the housing 1, in a region below the display unit 2, substantially-rectangular three push buttons 3g to 3i are arranged side by side. The game machine according to the present embodiment accepts the user's operation for the analog stick 3a through push button 3i and for the operation instrument 7 attached to the attachment unit 4. The game machine performs information processing concerning a game in accordance with the accepted content of operation.

Figure 2:
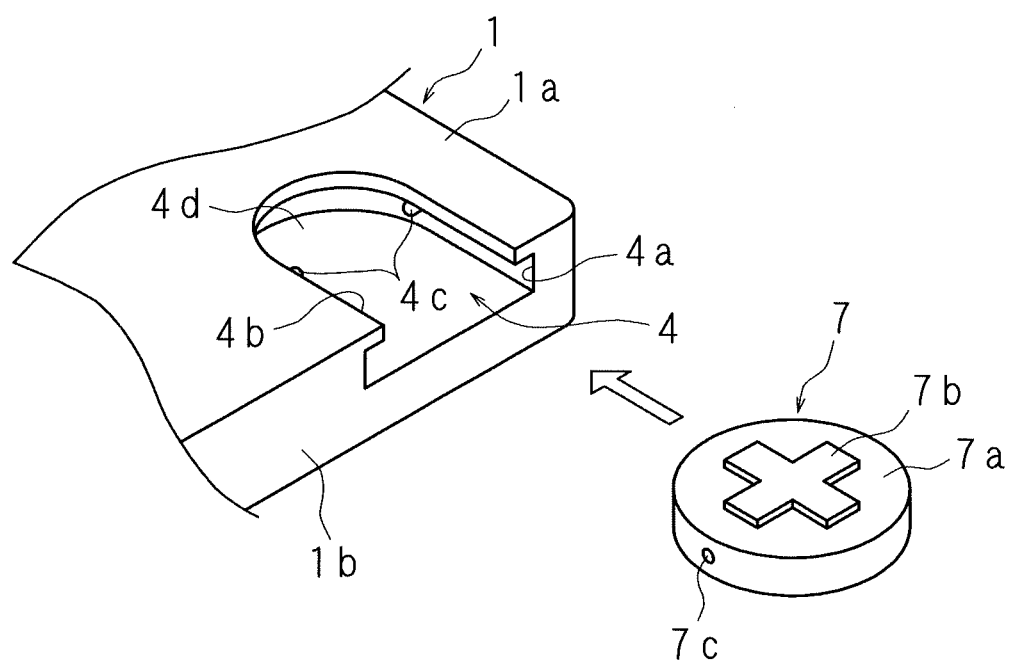
FIG. 2 shows an example non-limiting schematic enlarged perspective view illustrating a structure example of an attachment unit of a game machine and an operation instrument.

FIG. 2 shows an example non-limiting schematic enlarged perspective view illustrating a structure example of the attachment unit 4 of a game machine and the operation instrument 7. The operation instrument 7 has a structure in which a substantially cross-shaped indication part 7b is arranged in three dimensions on one surface of a substantially disc-shaped base unit 7a. The operation instrument 7 may be provided as an integrally-molded part formed of, for example, synthetic resin. On the operation instrument 7, substantially circular concave parts 7c are formed at two parts on the peripheral surface of the base unit 7a. Note that FIG. 2 only illustrates one of the two concave parts 7c. This is because the other one of the concave parts 7c is formed on the substantially opposite side on the peripheral surface of the base unit 7a.

The attachment unit 4 of the game machine is constituted as a recess formed on the housing 1. The operation instrument 7 may be attached to the attachment unit 4 by inserting the operation instrument 7 from an opening 4a formed on a right side surface 1b of the housing 1. The opening 4a has a substantially rectangular shape. The opening 4a is set to have its length substantially the same as or somewhat longer than the diameter of the base unit 7a of the operation instrument 7. The recess in the housing 1 continuing from the opening 4a is formed to have a substantially semicircular shape at the back side. At the recess forming the attachment unit 4, an open part 4b is formed on the front surface 1a of the housing 1. Through the open part 4b, the indication part 7b of the operation instrument 7 attached to the attachment unit 4 is exposed to the outside. The open part 4b has a shape one size smaller than the planar shape of the recess. The open part 4b is formed in such a manner that a part of the housing 1 is cut off from the right side surface 1b.

On the inner surface side of the recess, positioning protrusions 4c are arranged at two opposing parts. Each of the two positioning protrusions 4c is formed to be biased by a member such as, for example, a spring, so that the amount of protrusion may be changed. The positioning protrusion 4c is inserted into a concave part 7c formed on the peripheral surface of the operation instrument 7 inserted into the attachment unit 4. This allows the positioning protrusion 4c to define the attachment position of the operation instrument 7. On the inner surface 4d adjacent to the open part 4b in the recess of the attachment unit 4 and having the largest area, a pressure sensor for detecting operation for the attached operation instrument 7 and an antenna for short distance radio communication are placed. The pressure sensor and antenna will be described later in detail.

When the operation instrument 7 is attached to the attachment unit 4, the user slides and inserts the operation instrument 7 from the opening 4a into the recess. The user thrusts down the operation instrument 7 toward the back of the recess against the biased force by a spring or the like of the positioning protrusion 4c. By sliding the operation instrument 7 until the positioning protrusion 4c is inserted into the concave part 7c, the user may attach the operation instrument 7 to the attachment unit 4. When the operation instrument 7 is removed from the attachment unit 4, the user slides the operation instrument toward the opening 4a against the biased force by a spring or the like of the positioning protrusion 4c. This allows the user to release the insertion of the positioning protrusion 4c to the concave part 7c and to remove the operation instrument 7 from the opening 4a to the outside of the attachment unit 4.

In the game machine according to the present embodiment, other than the illustrated operation instrument 7, various operation instruments 7 having different structures may be attached to the attachment unit 4. In the operation instrument 7, an IC (Integrated Circuit) chip or the like having a wireless communication function is embedded. The game machine may determine the kind of the operation instrument 7 attached to the attachment unit 4 by performing wireless communication with the operation instrument 7. The game machine has a function of detecting operation performed by the user for the operation instrument 7 attached to the attachment unit 4. This allows the game machine to accept operation corresponding to the type of the operation instrument 7 attached to the attachment unit 4 and to perform game processing. In other words, the game machine may change the processing to be performed in accordance with the type of the operation instrument 7, when the operation for the operation instrument 7 attached to the attachment unit 4 is detected.

Figure 3:
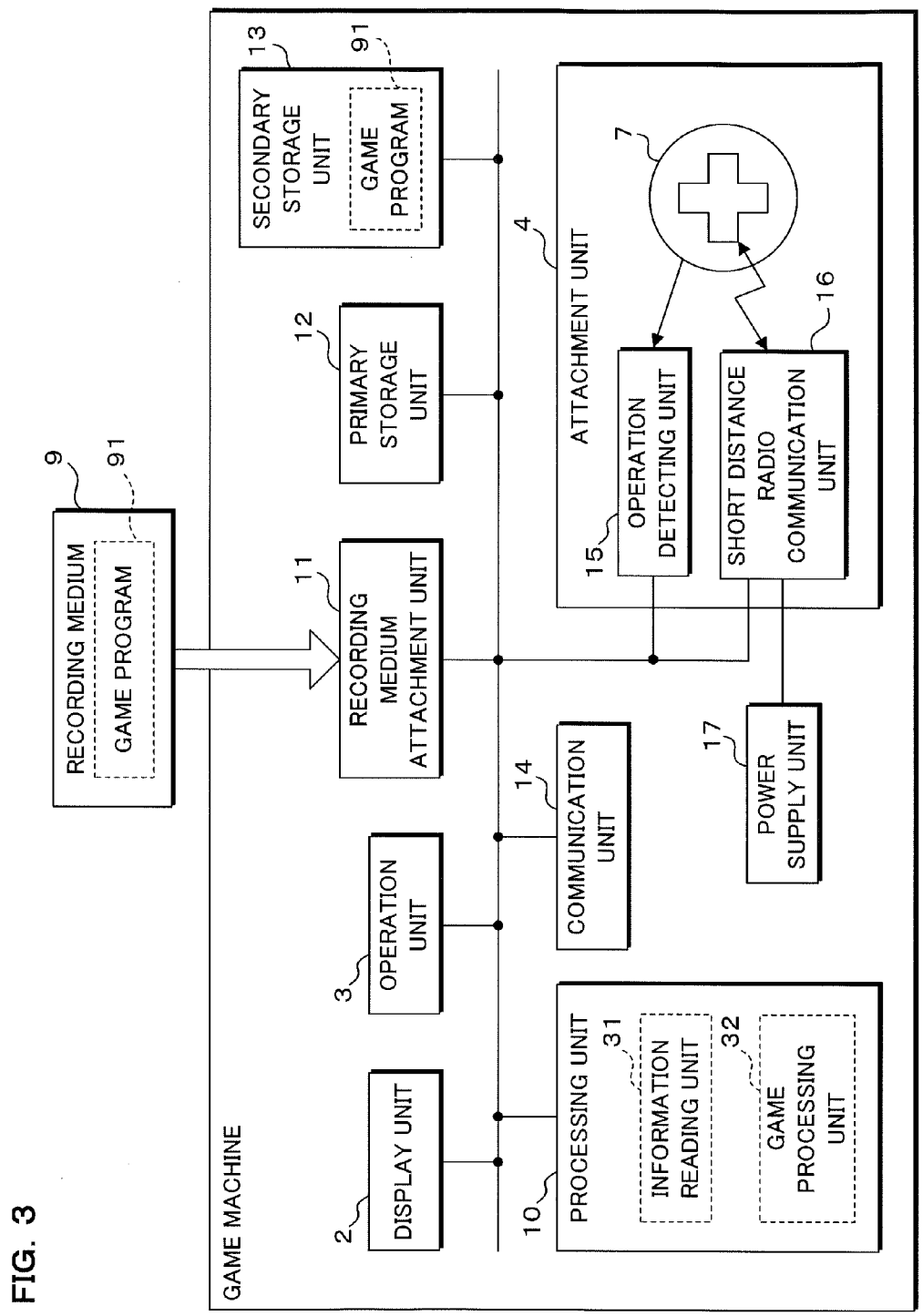
FIG. 3 shows an example non-limiting block diagram illustrating a configuration of the game machine according to Embodiment 1.
Figure 4:
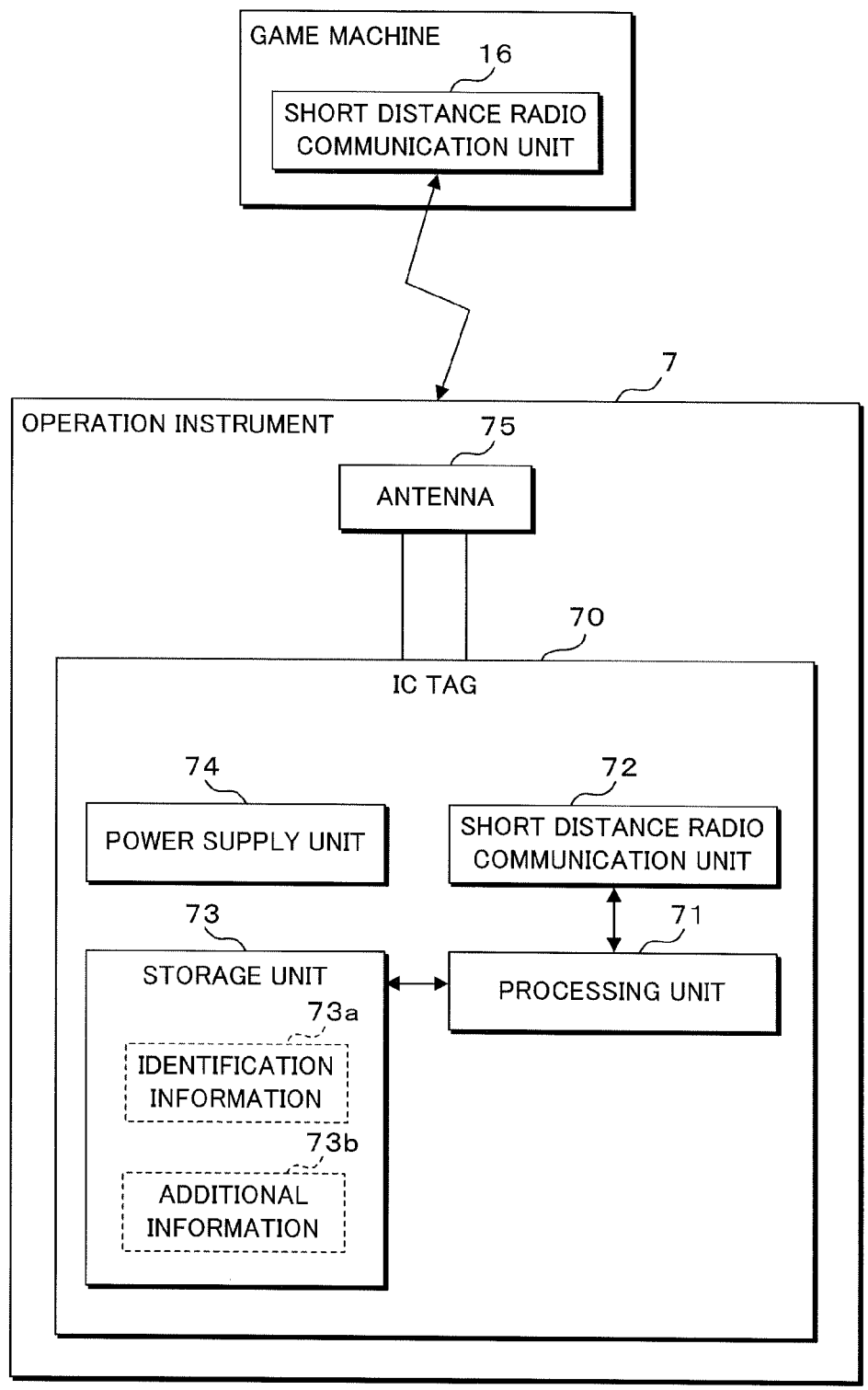
FIG. 4 shows an example non-limiting block diagram illustrating a configuration of an operation instrument according to Embodiment 1.

FIG. 3 shows an example non-limiting block diagram illustrating a configuration of the game machine according to Embodiment 1. FIG. 4 shows an example non-limiting block diagram illustrating a configuration of the operation instrument 7 according to Embodiment 1. As described above, the game machine according to the present embodiment includes a housing 1 provided with a display unit 2, an operation unit 3 having an analog stick 3a through a push button 3i and an attachment unit 4. As illustrated in FIG. 3, the housing 1 of the game machine contains a processing unit 10, a recording medium attachment unit 11, a primary storage unit 12, a secondary storage unit 13, a communication unit 14, an operation detecting unit 15, a short distance radio communication unit 16, a power supply unit 17 and the like.

The processing unit 10 of the game machine is configured with an arithmetic processing device such as a CPU (Central Processing Unit) or a MPU (Micro Processing Unit). The processing unit 10 reads out a game program 91 stored in the secondary storage unit 13 or a game program 91 stored in the recording medium 9 attached to the recording medium attachment unit 11 to the primary storage unit 12 and executes the read-out program. Thus, the processing unit 10 performs various kinds of information processing concerning a game. For example, the processing unit 10 performs processing of accepting operation performed for the operation unit 3. For example, the processing unit 10 performs processing of accepting operation performed for the operation instrument 7 attached to the attachment unit 4. For example, the processing unit 10 performs processing of generating a game image shown on the display unit 2 in accordance with the accepted operation, an event in a game or the like.

The display unit 2 is configured with, for example, a liquid-crystal panel or a PDP (Plasma Display Panel). The display unit 2 displays an image applied from the processing unit 10. The operation unit 3 reports the content of operation performed for the analog stick 3a through push button 3i to the processing unit 10. The content of operation include, for example, the direction and the amount of operation for the analog stick 3a. The content of operation further include, for example, pressing down or releasing of the push button 3i. The recording medium attachment unit 11 is, for example, placed on the back surface of the housing 1. The recording medium attachment unit 11 is so configured that the recording medium 9 of a card type, a cassette type, a disk type or the like may be attached thereto and removed therefrom. The processing unit 10 may read out the game program 91 or other data from the recording medium 9 attached to the recording medium attachment unit 11.

The primary storage unit 12 is configured with a semiconductor memory device and the like. The primary storage unit 12 temporarily stores various kinds of data generated along with arithmetic processing of the processing unit 10. The secondary storage unit 13 is configured with a non-volatile storage device having a larger volume compared to the primary storage unit 12. The secondary storage unit 13 stores the game program 91, other data and the like. The communication unit 14 performs transmission and reception of data with a server device, another game machine or the like, via a network such as a mobile telephone network or a wireless LAN (Local Area Network). For example, the game machine may communicate with the server device at the communication unit 14 to download the game program 91 and store it in the secondary storage unit 13.

The operation detecting unit 15 detects operation performed by the user for the operation instrument 7 attached to the attachment unit 4. The operation detecting unit 15 sends the detected result to the processing unit 10 as operation information. As will be described later in detail, the operation detecting unit 15 may, for example, detect a pressure applied to the operation instrument 7 by a pressure sensor.

The short distance radio communication unit 16 wirelessly transmits/receives non-contact data to/from an IC tag 70 (see FIG. 4) embedded in the operation instrument 7 according to a communication standard of ISO/IEC 18092 (so-called NFC), for example. Though in the present embodiment, the distance of communication by the short distance radio communication unit 16 is set as several centimeters, the distance is a mere example and is not limited thereto. The short distance radio communication unit 16 transmits a signal for instructing the IC tag 70 of the operation instrument 7 to read out the stored data. The short distance radio communication unit 16 receives desired data as a response from the IC tag 70. That is, the short distance radio communication unit 16 has a function of a so-called reader of the IC tag. The short distance radio communication unit 16 may have a configuration capable of transmitting a signal for giving a writing instruction together with write data. This allows the short distance radio communication unit 16 to write data to the IC tag 70. That is, the short distance radio communication unit 16 may have a function of a writer of the IC tag.

The power supply unit 17 supplies power stored in a battery (not illustrated) included in the game machine to each unit in the game machine. In the present embodiment, the power supply unit 17 supplies power to the short distance radio communication unit 16. The short distance radio communication unit 16 wirelessly feeds electric power from the power supply unit 17 to the IC tag 70 of the operation instrument 7. The operation instrument 7, therefore, is not required to have a battery or the like. By the power supplied from the game machine, the operation instrument 7 may make the IC tag 70 operate, and may perform short distance radio communication with the game machine.

The processing unit 10 is provided with an information reading unit 31, a game processing unit 32 and the like as software functional blocks by the execution of the game program 91 or a basic program such as an operating system. The information reading unit 31 performs short distance radio communication by the short distance radio communication unit 16 to read various kinds of information such as identification information stored in the operation instrument 7. The game processing unit 32 performs, for example, determination processing concerning a game in accordance with the operation by the user or the like for the operation unit 3 or operation instrument 7, or processing related to an event in a game.

As shown in FIG. 4, the operation instrument 7 has a structure in which the IC tag 70 and antenna 75 are embedded in a molded body of, for example, synthetic resin. The antenna 75 may have a structure in which metal wire is arranged in a spiral manner in the base unit 7a of the operation instrument 7 and both ends of the metal wire are connected to the IC tag 70. The IC tag 70 is provided as one IC chip. The IC tag 70 includes therein a processing unit 71, a short distance radio communication unit 72, a storage unit 73, a power supply unit 74 and the like.

The IC tag 70 does not have a power supply such as a battery. The IC tag 70 is operated by an electromotive force generated by electromagnetic induction when a radio signal is received by the antenna 75 from the short distance radio communication unit 16 of the game machine. The IC tag 70 is a so-called passive tag. The power supply unit 74 supplies power to the processing unit 71, short-distance radio communication unit 72, storage unit 73 and the like in the IC tag 70 based on the electromotive force described above. This allows each unit to operate. The short distance radio communication unit 72 in the IC tag 70 receives a signal transmitted from the short distance radio communication unit 16 of the game machine by the antenna 75. The short distance radio communication unit 72 sends data concerning the received signal to the processing unit 71. The short distance radio communication unit 72 transmits the data, sent from the processing unit 71, from the antenna 75 to the short distance wireless communication unit 16 of the game machine.

The storage unit 73 is configured with a data rewritable non-volatile memory device. The storage unit 73 stores data such as identification information 73a for identifying the operation instrument 7, other additional information 73b and the like. The processing unit 71 reads out data of the identification information 73a or additional information 73b from the storage unit 73 in accordance with the data sent from the short distance radio communication unit 72. The processing unit 71 sends the read-out data to the short distance radio communication unit 72 so as to be transmitted to the game machine. The processing unit 71 writes data to the storage unit 73 in accordance with the data sent from the short distance radio communication unit 72.

Figure 5:
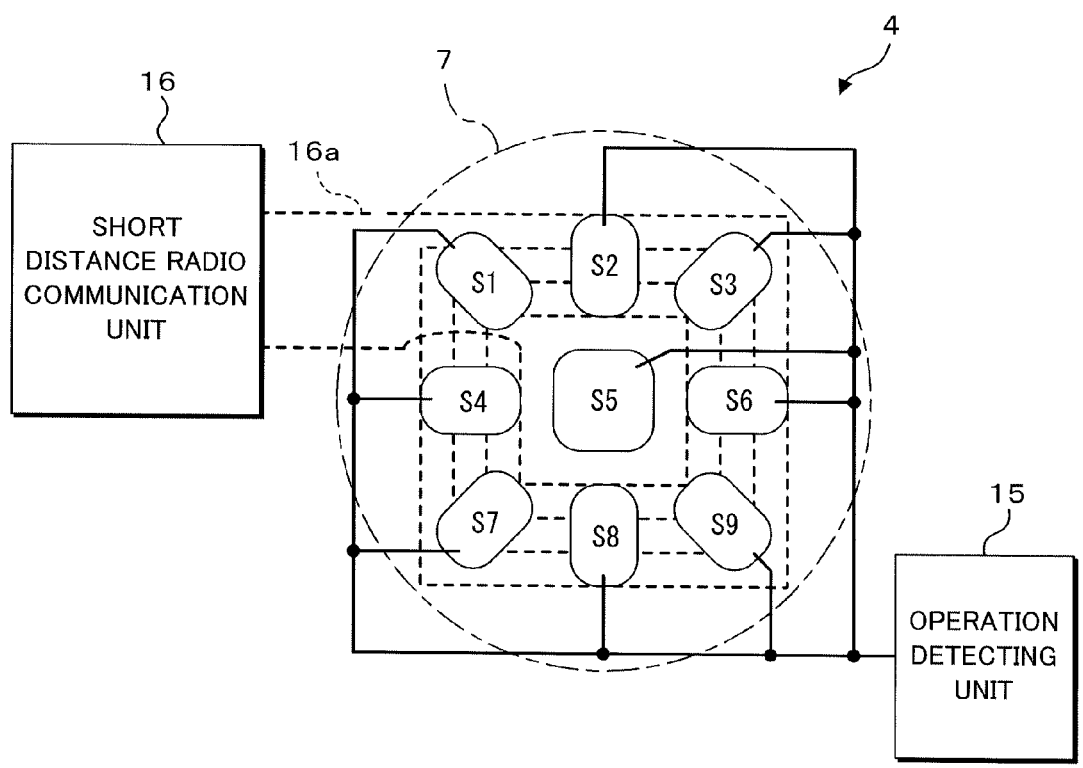
FIG. 5 shows an example non-limiting schematic view illustrating a structure of a pressure sensor and an antenna installed at an attachment unit of a game machine.

Next, a method of detecting the operation for the operation instrument 7 attached to the attachment unit 4 and the configuration of the antenna used by the short distance radio communication unit 16 of the game machine will be described. As described above, on the inner surface 4d of the attachment unit 4, a pressure sensor for detecting operation and an antenna for short distance radio communication are provided. FIG. 5 shows an example non-limiting schematic view illustrating the structure of a pressure sensor and an antenna installed at the attachment unit 4 of the game machine.

Nine pressure sensors S1 to S9 are arranged in matrix of three by three at the inner surface 4d of the attachment unit 4. One pressure sensor S5 located at the center has a substantially square shape. Each of the eight pressure sensors S1 to S4, S6 to S9 on the periphery has a substantially rectangular shape. The pressure sensors S1 to S4 and S6 to S9 are arranged in a radial pattern with respect to the pressure sensor S5 at the center. The pressure sensors S1 to S9 are so arranged that the center of the operation instrument 7 corresponds to the position of the pressure sensor S5 when the operation instrument 7 is attached to the attachment unit 4. In FIG. 5, the operation instrument 7 is illustrated by a circular shape of a dashed-dotted line.

Each of the pressure sensors S1 to S9 is connected to the operation detecting unit 15 through a signal line. Each of the pressure sensors S1 to S9 outputs a signal in accordance with an applied pressure to the operation detecting unit 15. The operation detecting unit 15 independently determines, based on the signals from each of the pressure sensors S1 to S9, whether or not a pressure is applied to each of the pressure sensors S1 to S9. The operation detecting unit 15 may further determine the intensity of the pressure applied to each of the pressure sensors S1 to S9.

An antenna 16a connected to the short distance radio communication unit 16 is arranged at the inner surface 4d of the operation unit 4. The antenna 16a is illustrated by a broken line in FIG. 5. The antenna 16a has a structure in which both ends of spiral metal wire are connected to the short distance radio communication unit 16. The antenna 16a is so provided as to be layered at the back side of the pressure sensors S1 to S9. By the antenna 16a, the short distance radio communication unit 16 may perform short distance radio communication with the operation instrument 7 attached to the attachment unit 7. Note that it is not always necessary to attach the operation instrument 7 to the attachment unit 4 in order for the short distance radio communication unit 16 of the game machine to perform short distance radio communication with the operation instrument 7. Depending on the communication range effective to the short distance radio communication unit 16 and the antenna 16a, such a structure may be possible that the short distance radio communication unit 16 is able to perform short distance radio communication with the operation instrument 7 which is not attached to the attachment unit 4. Accordingly, the game machine transmits and receives information to/from the operation instrument 7 by the short distance radio communication. For example, in the case where the attachment unit 4 is provided with an electric contact point for the operation instrument 7 to be electrically connected thereto, such a problem arises that the electric contact point is deteriorated by repeating attachment and removal of the operation instrument 7. The game machine according to the present embodiment would not generate such a problem.

In a state where the game machine is operating, the operation detecting unit 15 implements sampling on signals output from the pressure sensors S1 to S9 at a frequency of, for example, approximately once in one-sixtieth seconds. In accordance with the result of sampling, the operation detecting unit 15 determines whether or not a pressure is applied to the pressure sensors S1 to S9, i.e. whether or not operation is performed for the operation instrument 7. When operation is performed for the operation instrument 7, the operation detecting unit 15 reports, to the processing unit 10, which one of the pressure sensors S1 to S9 is the one at which a pressure is detected. The operation detecting unit 15 reports the intensity of the detected pressure to the processing unit 10.

The short distance radio communication unit 16 transmits radio signals at a frequency of, for example, once in several seconds, and reports to the processing unit 10 whether or not there is a response to the signals. The processing unit 10 determines whether or not the operation instrument 7 is attached to the attachment unit 4 in accordance with the presence/absence of the response. If it is determined that the operation instrument 7 is attached to the attachment unit 4, the information reading unit 31 of the processing unit 10 gives an instruction to the short distance radio communication unit 16 so as to read the identification information 73a and additional information 73b stored in the storage unit 73 of the operation instrument 7. The short distance radio communication unit 16 performs short distance radio communication with the operation instrument 7 in response to the instruction and instructs the operation instrument 7 to transmit information.

The processing unit 71 of the operation instrument 7 reads out the identification information 73a and additional information 73b from the storage unit 73 in response to the instruction from the game machine. The processing unit 71 transmits the read-out information to the game machine through the short distance radio communication unit 72. The short distance radio communication unit 16 in the game machine sends the identification information 73a and additional information 73b received from the operation instrument 7 to the processing unit 10. This allows the information reading unit 31 to read information on the operation instrument 7. The processing unit 10 determines a type or the like of the operation instrument 7 attached to the attachment unit 4 based on the read identification information 73a. The processing unit 10 performs limitation processing or addition processing related to the game processing based on the read additional information 73b. For example, the game machine stores association data between the identification information 73a and the type of operation instrument 7. The game machine determines the type of the attached operation instrument 7 by referring to the association data based on the read identification information 73a.

When rewriting the additional information 73b stored in the storage unit 73 of the operation instrument 7, the processing unit 10 gives an instruction for rewriting to the short distance radio communication unit 16 together with the information to be rewritten. The short distance radio communication unit 16 transmits information sent from the processing unit 10 to the operation instrument 7 to rewrite the additional information 73b in the storage unit 73. The short distance radio communication unit 16 may report that the rewriting of information is completed to the processing unit 10.

Assume, for example, the case where the operation instrument 7 provided with the substantially cross-shaped indication part 7b as illustrated in FIG. 1 and FIG. 2 is attached to the attachment unit 4 of the game machine. In such a case, short distance radio communication is first performed between the short distance radio communication unit 16 in the game machine and the short distance radio communication unit 72 in the operation instrument 7. This allows the processing unit 10 to determine that the operation instrument 7 is attached to the attachment unit 4. In the processing unit 10, the information reading unit 31 reads the identification information 73a from the operation instrument 7. The processing unit 10 may determine, based on the read identification information 73a, that the operation instrument 7 attached to the attachment unit 4 is the operation instrument 7 provided with the substantially cross-shaped indication part 7b.

The operation instrument 7 provided with the substantially cross-shaped indication part 7b is to accept substantially the same operation as that of the cross key 3b of the operation unit 3. The operation instrument 7 is used to accept, for example, the operation for moving a game character, the operation for selecting a menu and the like. Hereinafter, the operation instrument 7 will be referred to as "cross key operation instrument 7." The cross key operation instrument 7 is to accept operation with respect to four directions such as upper, lower, left and right. When a user presses the indication part 7b with respect to the cross key operation instrument 7 attached to the attachment unit 4, the base unit 7a of the operation instrument 7 is displaced. This displacement is conveyed to the pressure sensors S1 to S9 through the bottom surface part of the base unit 7a.

In the case where the cross key operation instrument 7 is attached to the attachment unit 4, the processing unit 10 detects the operation by the operation detecting unit 15 in accordance with the presence/absence of the pressure applied to the four pressure sensors S2, S4, S6 and S8 corresponding to upper, lower, left and right, respectively, among the nine pressure sensors S1 to S9 illustrated in FIG. 5. The game processing unit 32 in the processing unit 10 accepts the operation accepted at the operation detecting unit 15 as the operation for the cross key. The game processing unit 32 performs game processing such as, for example, movement of a game character in upper, lower, left or right direction in accordance with the operation for the operation instrument 7.

In the game system according to the present embodiment, various types of operation instruments 7 other than the cross key operation instrument 7 may be attached to the attachment unit 4 of the game machine. In the processing unit 10 of the game machine, the information reading unit 31 reads the identification information 73a of the operation instrument 7 attached to the attachment unit 4. The processing unit 10 determines a type of the operation instrument 7 in accordance with the read identification information 73a. In the processing unit 10, the game processing unit 32 performs the game processing in accordance with a type of the operation instrument 7. This allows the user to change the operation instrument 7 to be attached to the attachment unit 4 in accordance with a type of a game to be played on the game machine.

FIGS. 6A to 6D show example non-limiting schematic views illustrating other examples of the operation instrument 7. The operation instrument 7 illustrated in FIG. 6A has indication parts 7b so arranged to have a positional relationship in which four substantially circular parts respectively correspond to the apexes of a diamond. This operation instrument 7 is to accept substantially the same operation as that for the four push buttons 3c to 3f on the operation unit 3. The operation instrument 7 is used to accept operation for an action such as attacking or jumping of a game character, for example, or for deciding or canceling a selected menu item. Hereinafter, the operation instrument 7 will be referred to as "four push button operation instrument 7." When the four push button operation instrument 7 is attached to the attachment unit 4, the operation detecting unit 15 detects operation using the four pressure sensors S2, S4, S6 and S8 corresponding to the arrangement of the substantially circular indication parts 7b. The game processing unit 32 accepts operation for the operation instrument 7 as the operation for each of the individual push buttons. The game processing unit 32 performs game processing in accordance with the operation for each push button.

Figure 6A:
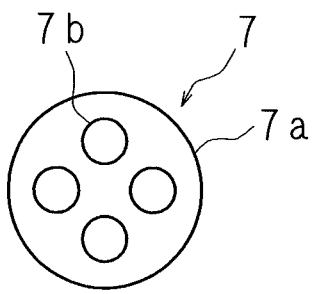
FIG. 6A shows an example non-limiting schematic view illustrating another example of an operation instrument.
Figure 6B:
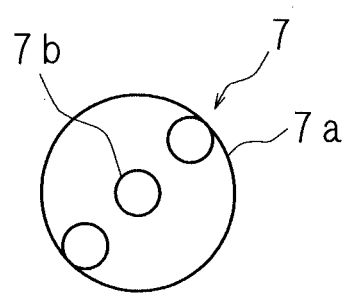
FIG. 6B shows an example non-limiting schematic view illustrating another example of an operation instrument.

The operation instrument 7 illustrated in FIG. 6B has indication parts 7b of three substantial circles arranged in a straight line. The operation instrument 7 is to accept operation similar to that for the three push buttons. Hereinafter, the operation instrument 7 is referred to as "three push button operation instrument 7." In the case where the three push button operation instrument 7 is attached to the attachment unit 4, the operation detecting unit 15 detects operation using three pressure sensors S3, S5 and S7 corresponding to the arrangement of the substantially circular indication parts 7b. The game processing unit 32 accepts the operation for the operation instrument 7 as the operation for each of the individual push buttons. The game processing unit 32 performs game processing in accordance with operation for each push button.

Figure 6C:
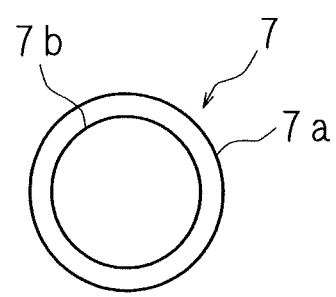
FIG. 6C shows an example non-limiting schematic view illustrating another example of an operation instrument.

The operation instrument 7 illustrated in FIG. 6C is provided with one substantially circular indication part 7b. This operation instrument 7 is to accept operation similar to that for one push button. Hereinafter, this operation instrument 7 will be referred to as "one push button operation instrument 7." In the case where the one push button operation instrument 7 is attached to the attachment unit 4, the operation detecting unit 15 detects operation using all the pressure sensors S1 to S9. The operation detecting unit 15 detects the operation for the operation instrument 7 when the application of a pressure to any one of the pressure sensors S1 to S9 is detected. It is, however, also possible for the operation detecting unit 15 to detect operation using, for example, one pressure sensor S5. The game processing unit 32 accepts the operation for the operation instrument 7 as the operation for one push button and performs game processing.

Figure 6D:
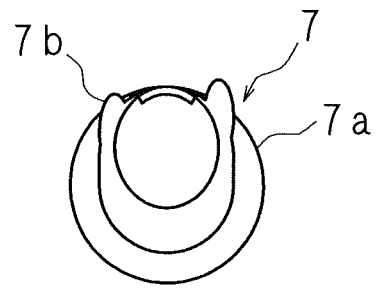
FIG. 6D shows an example non-limiting schematic view illustrating another example of an operation instrument.

The operation instrument 7 illustrated in FIG. 6D has a structure in which an indication part 7b formed to represent a three-dimensional game character stands on the base unit 7a. The operation instrument 7 is to operate, for example, a specific character appearing in a specific game. Hereinafter, this operation instrument 7 will be referred to as "character operation instrument 7." Several kinds of character operation instruments 7 may be prepared for different characters that appears in a game and may be operated. In the case where the character operation instrument 7 is attached to the attachment unit 4, which one of the pressure sensors S1 to S9 is used by the operation detecting unit 15 to detect operation depends on the content of a game. For example, in a game that uses the operation instrument 7 for moving a character, the operation detecting unit 15 may detect operation using four pressure sensors S2, S4, S6 and S8 as in the case with the cross key operation instrument 7. When operation for the operation instrument 7 is accepted, the game processing unit 32 performs game processing concerning a character corresponding to the operation instrument 7 attached to the attachment unit 4, for example, moving the corresponding character.

The character operation instrument 7 may store information having an effect on the progress of a game as the additional information 73b in the storage unit 73. The additional information 73b may include, for example, a physical strength, an attack power or an experience point for a character. In the processing unit 10 of the game machine, the information reading unit 31 reads the additional information 73b from the operation instrument 7 at a predetermined timing, such as after the operation instrument 7 is attached to the attachment unit 4, for example. The game processing unit 32 performs game processing in which the read additional information 73b is reflected. When the information concerning a character is changed in the game processing, the processing unit 10 of the game machine performs processing of rewriting the additional information 73b stored in the storage unit 73 of the operation instrument 7 to new information. The rewriting is performed at a predetermined timing such as every time the information is changed or when the game is finished, for example. Accordingly, even when, for example, a user plays one game with several different game machines, the result of the game played in the different game machines may be reflected by performing operation using a common character operation instrument 7.

The information stored in the storage unit 73 of the operation instrument 7 as the additional information 73b is not limited to the information concerning a character as described above. Some examples of using the additional information 73b of the operation instrument 7 will be described below. For example, information for the year, month, date and time concerning the expiration time of the operation instrument 7 may be stored as the additional information 73b. The information reading unit 31 of the game machine reads the expiration information stored as the additional information 73b from the operation instrument 7 attached to the attachment unit 4. The game processing unit 32 determines whether or not the year, month, date and time at the current time point is on or before the expiration time. If expired, the game processing unit 32 would not accept operation performed for the operation instrument 7 and would not perform game processing concerning the operation instrument 7. As for the expiration time, various setting may be possible such as date/time at which the use of operation instrument 7 is started, date/time at which the use is stopped, a usable period or the like.

For example, information concerning an access authorization for the game machine or game program 91 may be stored as the additional information 73b. For example, in the game program 91, the access authorization for a setting item of a game may be set in three stages of a child, parent and developer. The processing unit 10 of the game machine changes the content to be displayed as a setting item in accordance with the access authorization set as the additional information 73 in the operation instrument 7 attached to the attachment unit 4. For example, setting for stopping excessive blood-shedding expression or the like in a game may be set as the setting item of parent's authorization. For example, starting up of a debug mode may be set as the setting item of developer's authorization.

For example, setting information such as environment setting for a game machine for each user may be stored as the additional information 73b. For example, setting information such as the brightness of the display unit 2, the operation detecting level of the operation unit 3 or the like set by a user's preference is stored as the additional information 73b in the operation instrument 7. When the operation instrument 7 is attached to the attachment unit 4, the processing unit 10 of the game machine reads the additional information 73b from the operation instrument 7 and reflects the setting details of the setting information. In the case where the operation such as change of setting is performed, the processing unit 10 of the game machine updates the additional information 73b for the operation instrument 7.

For example, in a predetermined game program 91, information for bringing up a character or an item not appearing during a normal game may be stored as the additional information 73b. The processing unit 10 of the game machine may bring up an additional character, item or the like into a game in accordance with the additional information 73b while the operation instrument 7 in which such information is stored is attached to the attachment unit 4 and a predetermined game program 91 is being executed.

The information to be stored as the additional information 73b in the operation instrument 7 is not limited to the ones described above, and may be various kinds of information other than the above. The processing unit 10 of the game machine may perform various kinds of limitation processing, addition processing or the like in accordance with the additional information 73b read from the operation instrument 7. Accordingly, the game machine may perform different kinds of processing using the additional information 73b in addition to the processing of changing the content of accepted operation in accordance with the identification information 73a for the operation instrument 7. This may implement enhanced customization by the user concerning the game machine or game program 91. Security for the game machine or game program 91 may also be improved. A manufacturer or distributor of the game machine or game program 91 may offer various services, support or the like using the additional information 73b.

Figure 7:
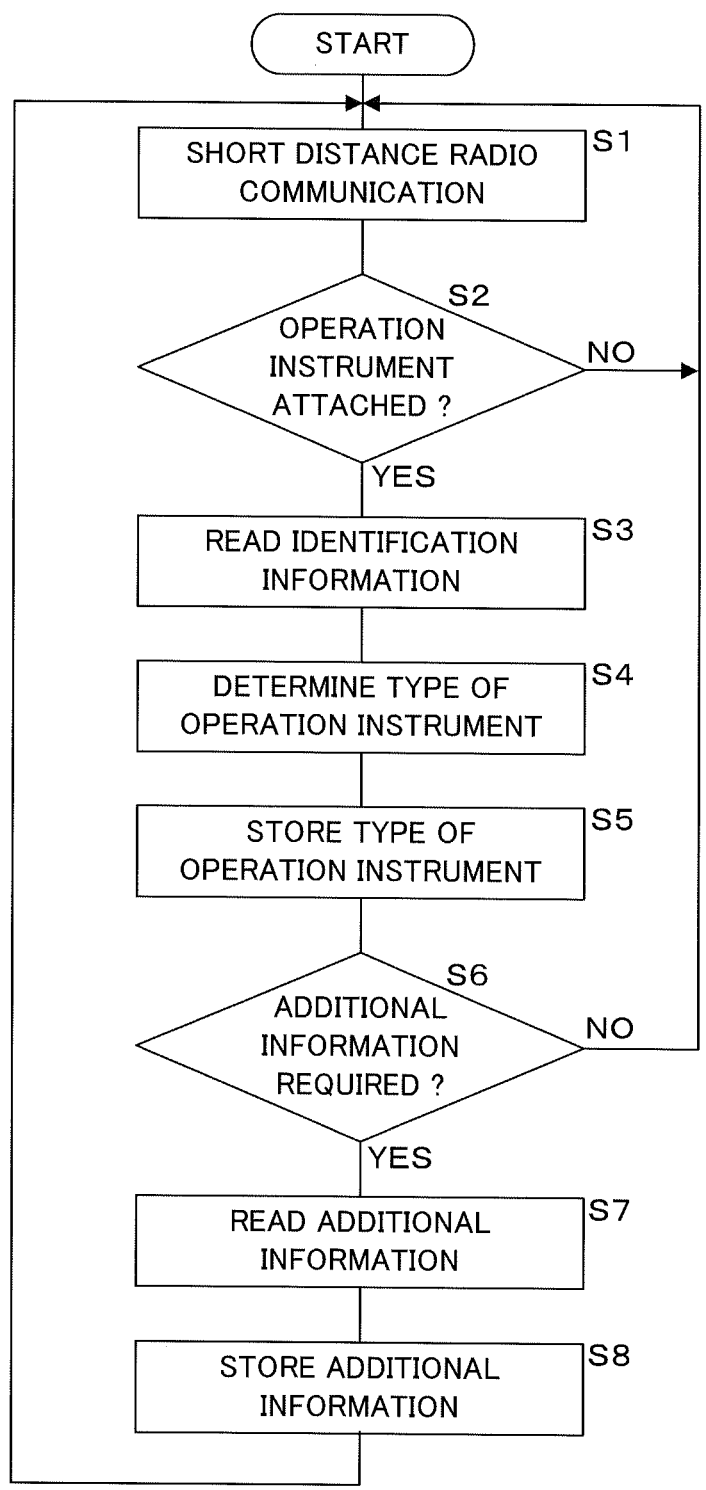
FIG. 7 shows an example non-limiting flowchart illustrating a processing procedure of communicating with an operation instrument performed by the game machine according to Embodiment 1.

FIG. 7 shows an example non-limiting flowchart illustrating a procedure of communication processing with the operation instrument 7 by the game machine according to Embodiment 1. The processing unit 10 of the game machine performs short distance radio communication by the short distance radio communication unit 16 (step S1). The processing unit 10 determines whether or not the operation instrument 7 is attached to the attachment unit 4 in accordance with the presence/absence of a response from the operation instrument 7 (step S2). If the operation instrument 7 is not attached (S2: NO), the processing unit 10 returns the processing to step S1 and periodically repeats the short distance radio communication.

If the operation instrument 7 is attached to the attachment unit 4 (S2: YES), the information reading unit 31 of the processing unit 10 reads the identification information 73a stored in the operation instrument 7 (step S3). Here, the information reading unit 31 sends an instruction for transmitting the identification information 73a to the operation instrument 7 through the short distance radio communication unit 16. The information reading unit 31 acquires the identification information 73a by receiving the identification information 73a transmitted from the operation instrument 7 at the short distance radio communication unit 16. The processing unit 10 determines a type of the operation instrument 7 attached to the attachment unit 4 in accordance with the read identification information 73a (step S4). The processing unit 10 stores the determined type of the operation instrument 7 in the primary storage unit 12 or the secondary storage unit 13 (step S5).

The processing unit 10 determines whether or not reading of the additional information 73b stored in the operation instrument 7 is required, in accordance with the type of the attached operation instrument 7 (step S6). If reading of the additional information 73b is not required (S6: NO), the processing unit returns the processing to step S1 and periodically repeats short distance radio communication. If reading of the additional information 73b is required (S6: YES), the information reading unit 31 of the processing unit 10 reads the additional information 73b stored in the operation instrument 7 (step S7). The processing unit 10 stores the read additional information 73b in the primary storage unit 12 or the secondary storage unit 13 (step S8), returns the processing to step S1 and periodically repeats short distance radio communication.

Figure 8:
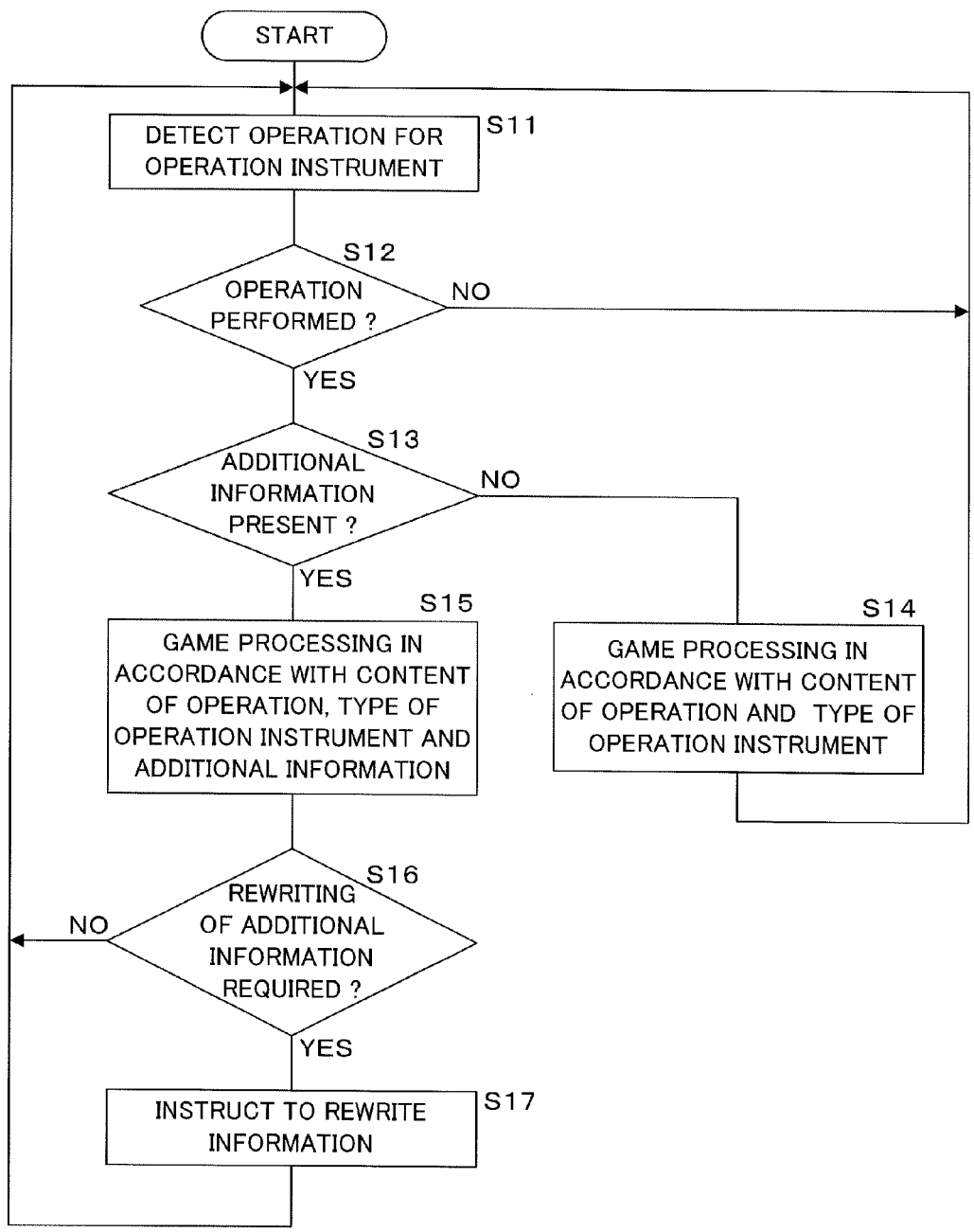
FIG. 8 shows an example non-limiting flowchart illustrating a processing procedure of accepting operation for an operation instrument performed by the game machine according to Embodiment 1.

FIG. 8 shows an example non-limiting flowchart illustrating a processing procedure of accepting operation for the operation instrument 7 performed by the game machine according to Embodiment 1. The processing unit 10 of the game machine detects presence/absence of pressure applied on the pressure sensors S1 to S9 arranged at the attachment unit 4. This allows the processing unit 10 to detect operation for the operation instrument 7 (step S11). Here, the processing unit 10 decides which one or ones of the pressure sensors S1 to S9 is/are used to detect operation in accordance with the type of the operation instrument 7 stored in the primary storage unit 12 or secondary storage unit 13 at step S5. The pressing unit 10 determines whether or not operation for the operation instrument 7 attached to the attachment unit 4 is performed (step S12). If no operation is performed (S12: NO), the processing unit 10 returns the processing to step S11 and periodically detects operation.

If operation for the operation instrument 7 is performed (S12: YES), the processing unit 10 determines presence/absence of the additional information 73b concerning this operation instrument (step S13). Here, the processing unit 10 may determine presence/absence of the additional information 73b in accordance with the type of the operation instrument 7 stored at step S5. If no additional information is present (S13: NO), the game processing unit 32 in the processing unit 10 performs game processing in accordance with the content of operation detected at step S11 and with the type of the operation instrument 7 (step S14). The processing unit 10 returns the processing to step S11 and periodically detects operation.

If the additional information 73b is present (S13: YES), the game processing unit 32 in the processing unit 10 performs game processing in accordance with the content of operation detected at step S11, with the type of the operation instrument 7 and with the additional information 73b stored at step S8 (step S15). The processing unit 10 determines whether or not rewriting of the additional information 73b is required due to the game processing (step S16). If rewriting of the additional information is not required (S16: NO), the processing unit 10 returns the processing to step S11 and periodically detects operation. If rewriting of the additional information 73b is required (S16: YES), the processing unit 10 transmits information to be rewritten to the operation instrument 7 through the short distance radio communication unit 16, and instructs the operation instrument 7 to rewrite the additional information 73b (step S17). The processing unit 10 returns the processing to step S11 and periodically detects operation.

The game system according to Embodiment 1 with the configuration described above includes the game machine provided with the attachment unit 4 for the operation instrument 7. The game machine has a structure in which a user may change various operation instruments 7 one from another to be attached to the attachment unit 4. The operation instrument 7 includes the storage unit 73 storing the identification information 73a therein. The operation instrument 7 includes the short distance radio communication unit 72 performing short distance radio communication with the game machine. The game machine includes the operation detecting unit 15 detecting operation for the operation instrument 7 attached to the attachment unit 4. The game machine includes the short distance radio communication unit 16 performing short distance radio communication with the operation instrument 7. The processing unit 10 of the game machine makes the information reading unit 31 read the identification information 73a from the operation instrument 7 attached to the attachment unit 4. The processing unit 10 makes the game processing unit 32 perform game processing in accordance with the read identification information 73a and the operation for the operation instrument 7 detected by the operation detecting unit 15. Such a configuration allows the game machine to accept operation in accordance with the type of the operation instrument 7 attached to the attachment unit 4 and to perform game processing. Accordingly, with the game machine, the user may change the operation instrument 7 in accordance with the content of a game and thus the game machine may accept operation suitable to the content of the game.

The additional information 73b is stored in the storage unit 73 of the operation instrument 7. The processing unit 10 of the game machine performs limitation processing or addition processing in accordance with the additional information 73b. Thus, the user of the game machine may be provided with various services using the additional information 73b. As the additional information 73b, for example, information concerning a character in a game, expiration information of the operation instrument 7, access authorization information of the game machine, setting information of the game machine for each user or the like may be stored.

Two positioning protrusions 4c are provided at the attachment unit 4 of the game machine. The operation instrument 7 is positioned by inserting the positioning protrusions 4c into the two concave parts 7c formed at the operation instrument 7. This structure can prevent the operation instrument 7 from being incorrectly attached to the attachment unit 4. The pressure sensors S1 to S9 arranged in matrix at the attachment unit 4 are used to detect operation for the operation instrument 7. According to this structure, various kinds of operation for the operation instrument 7 may easily and reliably be detected.

The operation instrument 7 is provided with the indication part 7b. According to this structure, for example, the processing content such as acceptance of operation performed in the game machine when the operation instrument 7 is attached may be presented to the user. The indication part 7b is provided to have a three-dimensional shape. This structure allows the user to determine by tactile sense which operation instrument 7 is attached to the attachment unit 4. The type, shape and the like of the operation instrument 7 are not limited to the ones illustrated in FIGS. 1, 2 and 6.

Though, in the present embodiment, the game system having a portable game machine and operation instrument 7 has been described by way of example, it is not limited thereto. For example, the controller of a stationary game machine may be provided with the attachment unit 4. A similar structure may be applied to various information processing devices other than a game machine, such as a mobile phone, a smart phone, a tablet information terminal or a PC (Personal Computer), for example.

Though the attachment unit 4 of the game machine described above has a structure in which the operation instrument 7 is slid and attached from the right side surface 1b of the housing 1, the way of attachment is not limited thereto. The structure of the attachment unit 4 illustrated in FIGS. 1, 2 or the like is a mere example. The attachment unit 4 may have various other structures in which the operation instrument 7 may be attached thereto. For example, the attachment unit 4 may have a structure in which the operation instrument 7 is fit into a recess formed on the front surface 1a of the housing 1 of the game machine. In this structure, positioning may be performed by, for example, a protrusion extending from the bottom surface of the recess of the attachment unit 4 and by a concave part formed on the back surface of the base unit 7a of the operation instrument 7.

Though it was described that the operation detecting unit 15 periodically detects the operation for the operation instrument 7 at a frequency of once in one-sixtieth seconds, the cycle is a mere example and is not limited thereto. Though it was also described that the short distance radio communication unit 16 periodically performs short distance radio communication at a frequency of once in several seconds, the cycle is a mere example and is not limited thereto. The short distance radio communication by the short distance radio communication unit 16 may be performed at a predetermined timing, e.g. after the operation instrument 7 is attached to the attachment unit 4, not periodically. It is also possible to employ such a structure that attachment of the operation instrument 7 may be detected by, for example, the game machine detecting whether the positioning protrusion 4c is in or out associated with the attachment of the operation instrument 7. In this case, the game machine may perform short distance radio communication in accordance with the detection of attachment.

In the description above, the identification information 73a and additional information 73b are stored in the storage unit 73 of the operation instrument 7. It is, however, not necessary for the operation instrument 7 not requiring the additional information 73*b* to have the additional information 73*b* stored in the storage unit 73. The storage unit 73 of the operation instrument 7 may be rewritable for data. However, the operation instrument 7 not requiring data rewriting may also have a configuration in which data in the storage unit 73 is not rewritable.

The arrangement, shape and the like of the pressure sensors S1 to S9 and antenna 16*a* illustrated in FIG. 5 are exemplary and not limitative. The operation for the operation instrument 7 may be detected not by the pressure sensors S1 to S9 but by another method. For example, the game machine may have such a configuration that a touch sensor is used to detect the operation for the operation instrument 7.

In the case where a touch sensor is used for detecting operation, the touch sensor may be located not at the attachment unit 4 but on the surface of the display unit 2 to form a touch panel. Here, it is also possible to place the operation instrument 7 on the touch panel for operation. The operation instrument 7 may also be a touch pen including the IC tag 70 therein. The game machine may have such a configuration that game processing is performed in accordance with the coordinates at which the touch pen come into contact with the touch panel, and with the identification information 73*a* or additional information 73*b* stored in the touch pen.

Though it was described that the operation instrument 7 is prepared as an integrally-molded part made of synthetic resin or the like, the operation instrument 7 is not limited to such a form. The operation instrument 7 may be formed by assembling multiple parts. For example, the operation instrument 7 may have a configuration with a movable part such as a lever displaced or a button going in or coming out in accordance with the operation by the user. In this case, the operation instrument 7 may further include a mechanism part for conveying the displacement of the movable part to the operation detecting unit 15 of the game machine.

Through it was described that the game machine periodically performs short distance radio communication with the operation instrument 7 to acquire the identification information 73*a* and additional information 73*b*, the configuration is not limited thereto. For example, the game machine may have such a configuration that short distance radio communication is performed with the operation instrument 7 when operation for the operation instrument 7 is detected at the operation detecting unit 15.

Variation

Figure 9:
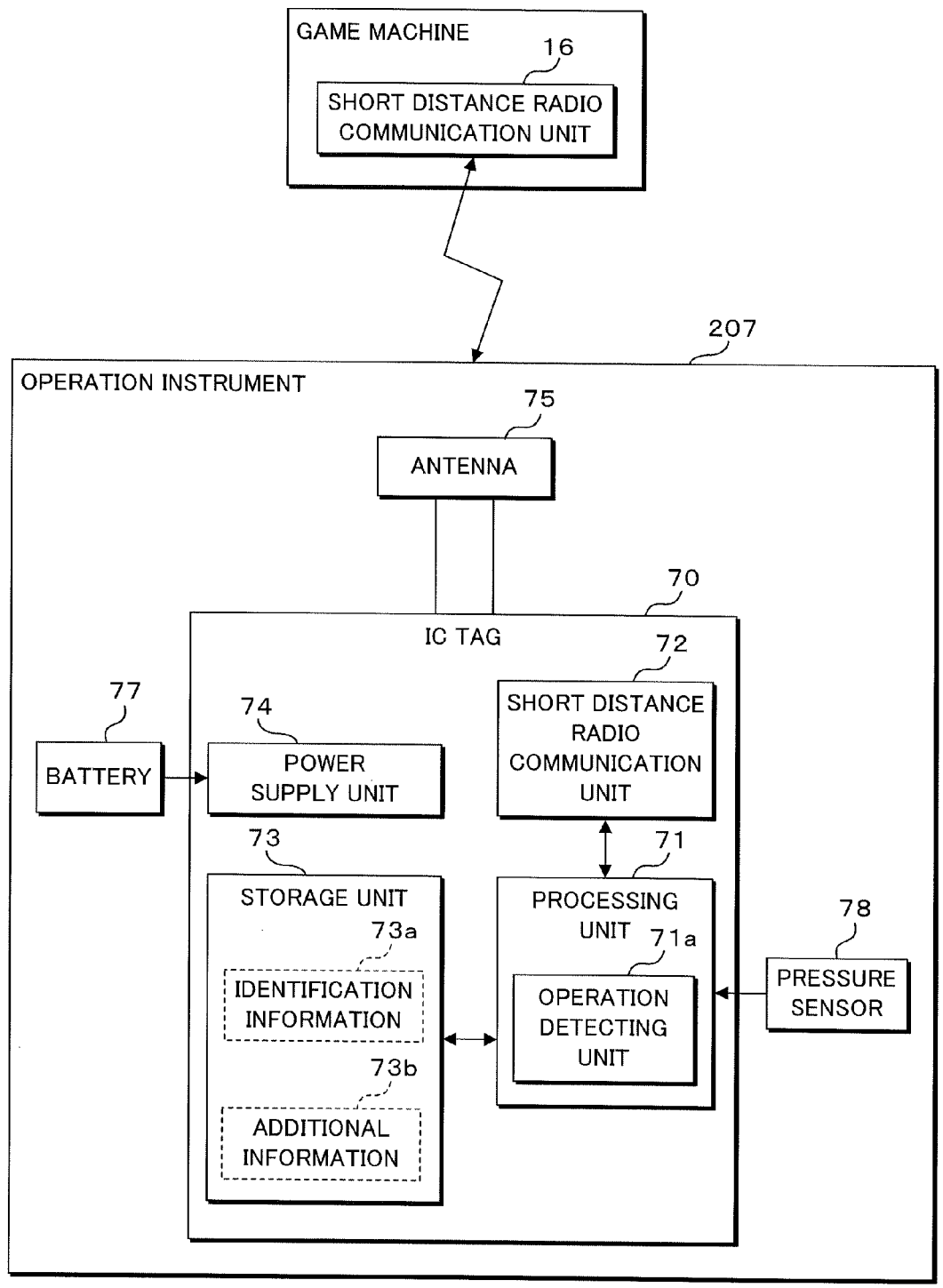
FIG. 9 shows an example non-limiting block diagram illustrating a structure of an operation instrument according to a variation.

Though it was described that the game machine is provided with the operation detecting unit 15 for detecting operation for the operation instrument 7, the configuration is not limited thereto. FIG. 9 shows an example non-limiting block diagram illustrating the configuration of an operation instrument 207 according to a variation. The operation instrument 207 according to the variation includes one or more pressure sensors 78. The operation instrument 207 may detect the pressure applied to the base unit 7*a* or indication part 7*b* at the pressure sensor 78. The detection result of the pressure sensor 78 is sent to the processing unit 71 of the IC tag 70. An operation detecting unit 71*a* of the processing unit 71 detects operation for the operation instrument 207 in accordance with the applied pressure.

The operation instrument 207 according to the variation includes a battery 77. In the operation instrument 207, a power supply unit 74 supplies power stored in the battery 77 to each unit in the IC tag 70, which operates the IC tag 70. The operation instrument 207 may detect operation by the pressure sensor 78 regardless of the presence/absence of short distance radio communication with the game machine. For example, the operation detecting unit 71*a* of the processing unit 71 periodically perform operation detection by the pressure sensor 78 at a frequency of approximately once in one-sixtieth seconds.

When the operation detecting unit 71*a* detects operation, the operation instrument 207 reports the detection of operation to the game machine through the short distance radio communication unit 72. The operation detection may be reported from the operation instrument 207 to the game machine as a response to the transmission of radio signals from the game machine to the operation instrument 207, or voluntarily by the operation instrument 207 at its own timing. In the case where the operation instrument 207 voluntarily performs short distance radio communication with the game machine, the game machine may have such a configuration that periodical short distance radio communication with the operation instrument 207 is not performed.

Embodiment 2

Figure 10:
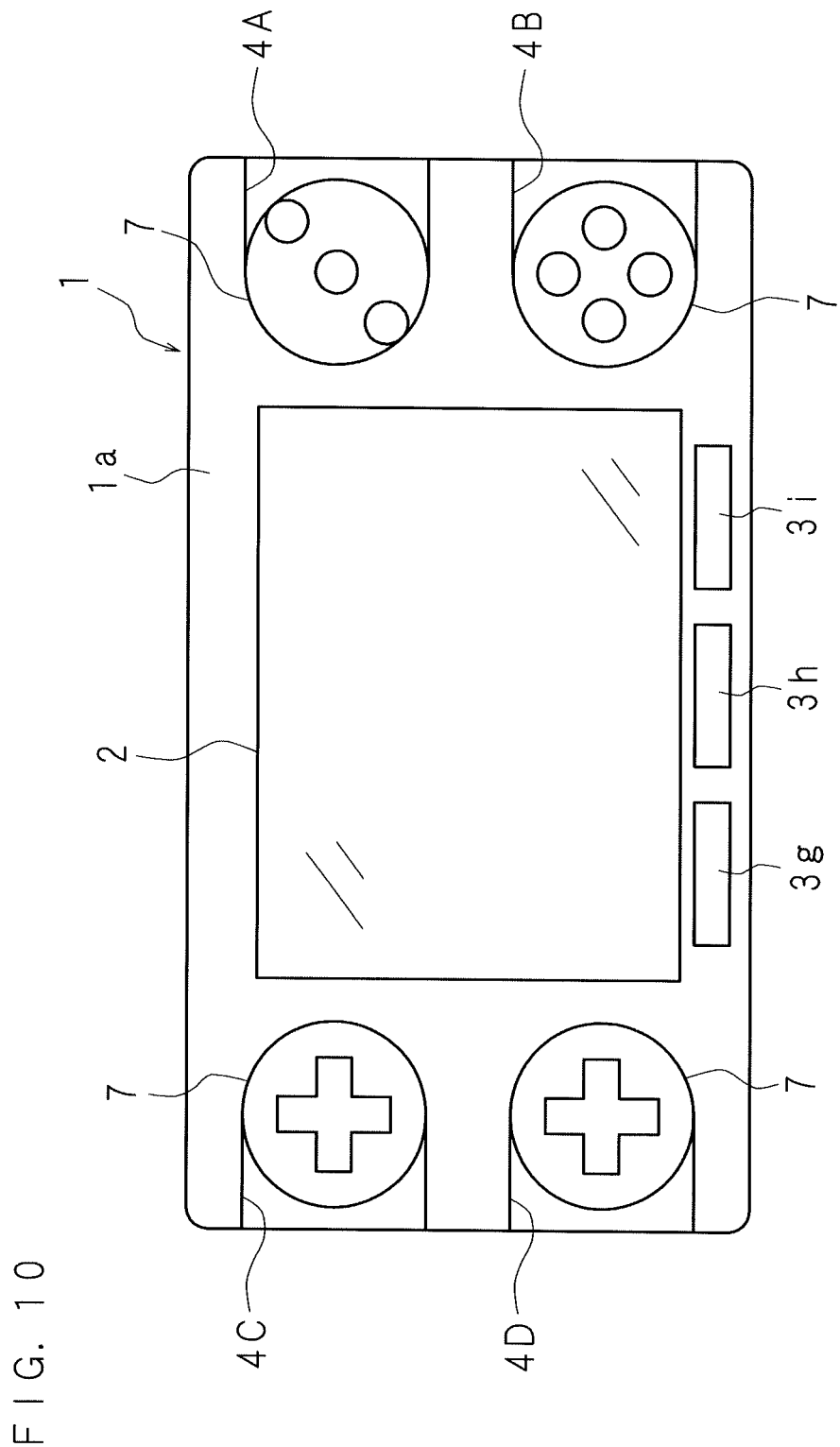
FIG. 10 shows an example non-limiting schematic view illustrating an appearance of a game machine and an operation instrument according to Embodiment 2.
Figure 11:
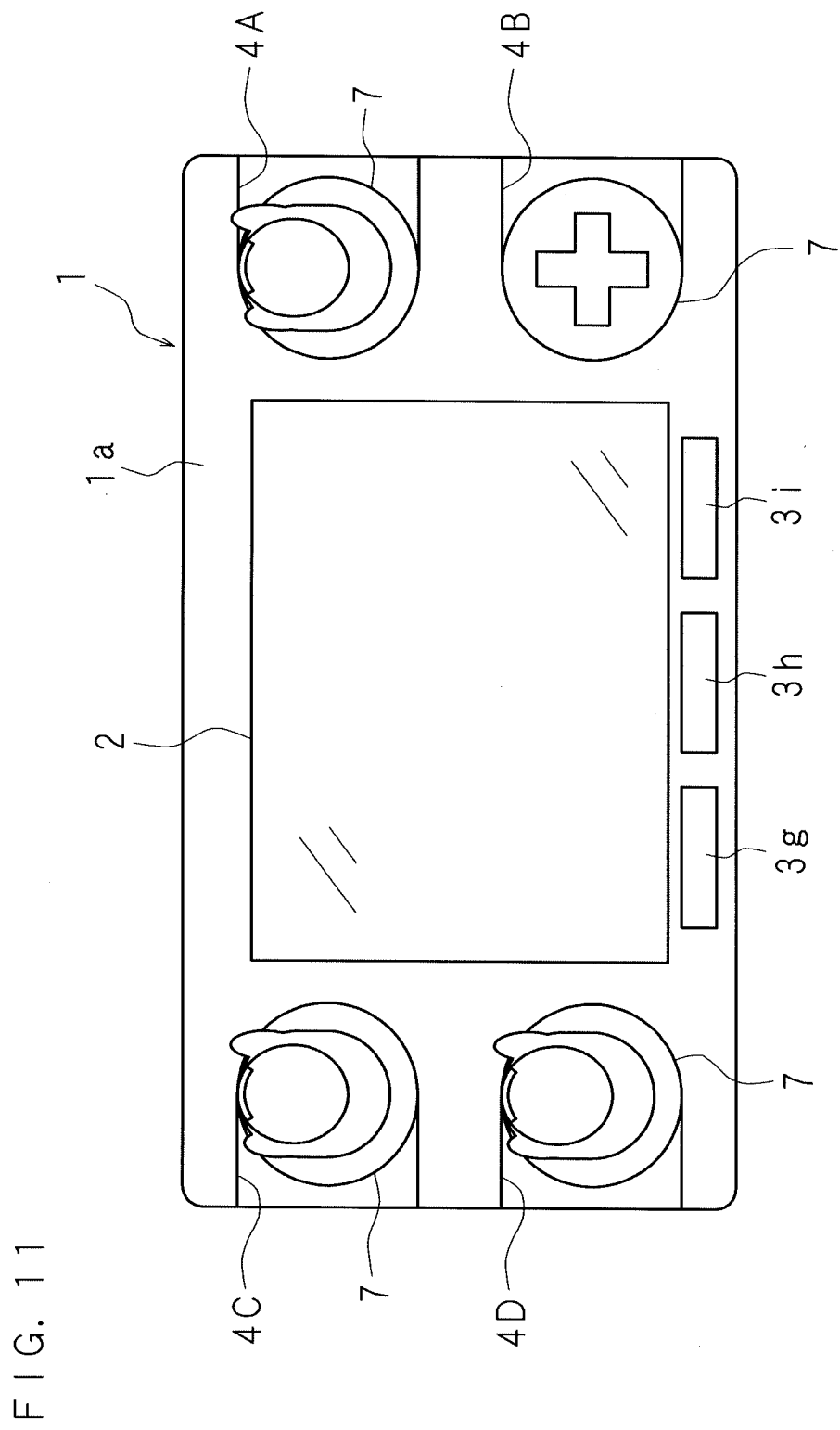
FIG. 11 shows an example non-limiting schematic view illustrating an appearance of a game machine and an operation instrument according to Embodiment 2.

The game machine according to Embodiment 2 includes more than one attachment units 4 to which the operation instruments 7 are attached. FIGS. 10 and 11 show example non-limiting schematic views, each illustrating the appearance of a game machine and operation instruments according to Embodiment 2. The game machine according to Embodiment 2 includes four attachment units 4A to 4D to which the operation instruments 7 are attached. At the housing 1 of the game machine according to Embodiment 2, attachment units 4A and 4B are vertically arranged in a region on the right side of the display unit 2. At the housing 1 of the game machine, attachment units 4C and 4D are vertically arranged in a region on the left side of the display unit 2. Here, the attachment units 4B to 4D are arranged in place of the analog stick 3*a*, cross key 3*b*, push buttons 3*c* to 3*f* included in the game machine according to Embodiment 1.

Each of the attachment units 4A to 4D is provided with the pressure sensors S1 to S9 and antenna 16*a* as illustrated in FIG. 5. The game machine may perform detection of operation for the operation instrument 7 attached to the attachment units 4A to 4D and short distance radio communication with the operation instrument 7 individually. It is noted that the game machine may be so configured that the communication range of short distance radio communication in the attachment units 4A to 4D do not overlap with each other. The game machine may also be configured to perform short distance radio communication with each operation instrument 7 in each of the attachment units 4A to 4D at a different timing not overlapping with each other.

The game machine according to Embodiment 2 may attach different operation instruments 7 to the four attachment units 4A to 4D, respectively, depending on the user's preference or the like. In the example shown in FIG. 10, the three push button operation instrument 7 is attached to the attachment unit 4A. At the attachment unit 4B, the four push button operation instrument 7 is attached. At each of the attachment units 4C and 4D, the cross key operation instrument 7 is attached. The processing unit 10 of the game machine reads the identification information 73*a* through short distance radio communication with the operation instrument 7 attached to each of the attachment units 4A to 4D, and determines the type of each operation instrument 7. When the operation for the operation instrument 7 is detected at each of the attachment units 4A to 4D, the processing unit 10 performs game processing in accordance with the type of the operation instrument 7.

For example, even if the game played by the user on the game machine is a game requiring two cross keys as well as three push buttons and four push buttons, the attachment position of each operation instrument 7 is not limited to the one illustrated in FIG. 10. In the game machine, the operation instrument 7 may be attached to have an arrangement suitable to the user's preference. For example, though not illustrated, the cross key operation instrument 7 may be attached to each of the attachment units 4A and 4B. The four push button operation instrument 7 may be attached to the attachment unit 4C. The three push button operation instrument 7 may be attached to the attachment unit 4D.

In the example shown in FIG. 11, the character operation instruments 7 are attached to the attachment units 4A, 4C and 4D. The cross key operation instrument 7 is attached to the attachment unit 4B. In the present example, the operation instruments 7 provided with indication parts 7b of different characters are attached to the attachment units 4A, 4C and 4D, respectively. For example, the game machine accepts operation such as movement of three characters in a predetermined game at the operation instruments 7 attached to the attachment units 4A, 4C and 4D. The game machine accepts operation not depending on a character in a game at the cross key operation instrument 7 attached to the attachment unit 4B. When a character to be operated is changed, the user may remove the operation instrument 7 from the attachment unit 4A, 4C or 4D, and attach the operation instrument 7 for another character instead.

The game machine according to Embodiment 2 with the structure above includes more than one attachment units 4 to which the operation instruments 7 are attached. In the game machine, more than one operation instruments 7 may be attached to arbitrary attachment units 4. This allows the user to attach the multiple operation instruments 7 for performing game operation to the game machine with an arrangement as desired. Since the multiple attachment units 4 included in the game machine reduces the constraint related to the operation unit in development of the game program 91, the user may be provided with various types of games.

Though, in the present embodiment, the game machine includes four attachment units 4, the structure is not limited thereto. The game machine may also include less than or more than four attachment units 4. The types and arrangements of the operation instruments 7 illustrated in FIGS. 10 and 11 are mere examples and are not limited thereto. In the game machine, different types of attachment units 7 other than the illustrated ones may be attached with various arrangements.

The other configuration parts in the game system according to Embodiment 2 is similar to the configuration parts in the game system according to Embodiment 1, similar parts are denoted by the same reference codes and will not be described in detail.

It should be understood that, in this specification, an element represented in a singular form with "a" or "an" put in front of a word does not exclude a plural form of such element.

In the game system according to the present embodiment, an information processing device accepts operation in accordance with an attached operation instrument and performs information processing. The present game system is to enable an operation instrument to be changed in accordance with the content of information processing. The user may attach an operation instrument suitable to the content of information processing to the information processing device. The information processing device may accept operation suitable to the content of information processing.

What is claimed is:

1. An information processing system, comprising:
   an operation instrument to be operated by a user, having a storage unit storing information and a first short distance radio communication unit performing transmission/reception of data with an information processing device; and
   an information processing device having an attachment unit to which the operation instrument is attached, a second short distance radio communication unit performing transmission/reception of data with the operation instrument, an information reading unit reading information stored in the storage unit of the operation instrument through the second short distance radio communication unit, and a processing unit performing processing in accordance with read information read by the information reading unit and operation information indicating operation for the operation instrument attached to the attachment unit, wherein
   the information processing device has a power supply unit wirelessly supplying power to the operation instrument, and
   the first short distance radio communication unit performs transmission/reception of data with the information processing device by the power supplied from the power supply unit.

2. The information processing system according to claim 1, wherein
   the information processing device has a first operation detecting unit detecting operation for the operation instrument attached to the attachment unit and outputting the operation information.

3. The information processing system according to claim 2, wherein
   the first operation detecting unit is configured to detect a pressure applied to the operation instrument by a pressure sensor.

4. The information processing system according to claim 1, wherein
   the information processing device has a positioning part defining an attachment position of the operation instrument with respect to the attachment unit.

5. The information processing system according to claim 1, wherein
   the storage unit is so configured that information in the storage unit is rewritable.

6. The information processing system according to claim 1, wherein
   the operation instrument has a movable part displaced in accordance with operation, and a mechanism part for conveying displacement of the movable part to the processing unit.

7. The information processing system according to claim 1, wherein
   the information processing device has a plural number of the attachment units, and a plural number of the operation instruments are arbitrarily attachable to the plural number of the attachment units.

8. The information processing system according to claim 1, wherein
   the information reading unit is configured to read information stored in the storage unit of the operation instrument regardless of presence/absence of operation for the operation instrument.

9. The information processing system according to claim 1, wherein
   the storage unit stores first information for identifying each operation instrument.

10. The information processing system according to claim 9, wherein
    the storage unit stores second information for performing limitation processing or addition processing for processing performed by the processing unit in accordance with the first information and the operation information.

11. The information processing system according to claim 10, wherein
the information reading unit reads the first information and the second information, and
the processing unit performs processing in accordance with the first information and second information read by the information reading unit and with the operation information.

12. The information processing system according to claim 10, wherein
the second information is information concerning a user of the information processing device.

13. The information processing system according to claim 10, wherein
the processing unit performs processing concerning a game, and
the second information is information concerning a character in a game.

14. The information processing system according to claim 10, wherein
the second information is expiration information concerning expiration time of the operation instrument, and
the processing unit limits processing corresponding to the read information and the operation information in accordance with the expiration information.

15. The information processing system according to claim 10, wherein
the second information is limitation information concerning a processing content of the processing unit, and
the processing unit limits processing corresponding to the read information and the operation information in accordance with the limitation information.

16. The information processing system according to claim 1, wherein
the operation instrument has an indication part indicating processing performed by the information processing device in accordance with operation.

17. The information processing system according to claim 16, wherein
the indication part is provided at the operation instrument in a three-dimensional manner.

18. The information processing system according to claim 1, wherein
the operation instrument has a second operation detecting unit detecting operation for the operation instrument and outputting the operation information,
the operation instrument is configured to transmit the operation information output by the second operation detecting unit to the information processing device through the first short distance radio communication unit, and
the processing unit is configured to perform processing in accordance with the operation information received from the operation instrument.

19. The information processing system according to claim 18, wherein
the second operation detecting unit is configured to detect a pressure applied to the operation instrument by a pressure sensor.

20. A game system, comprising:
an operation instrument to be operated by a user, having a storage unit storing information and a first short distance radio communication unit performing transmission/reception of data with an information processing device; and
an information processing device having an attachment unit to which the operation instrument is attached, a second short distance radio communication unit performing transmission/reception of data with the operation instrument, an information reading unit reading information stored in a storage unit of the operation instrument through the second short distance radio communication unit, and a processing unit performing processing concerning a game in accordance with read information read by the information reading unit and operation information indicating operation for an operation instrument attached to the attachment unit, wherein
the information processing device has a power supply unit wirelessly supplying power to the operation instrument, and
the first short distance radio communication unit performs transmission/reception of data with the information processing device by the power supplied from the power supply unit.

21. An information processing device, comprising:
an attachment unit to which an operation instrument to be operated by a user, having a storage unit storing information and a first short distance radio communication unit performing transmission/reception of data with an information processing device is attached;
a second short distance radio communication unit performing transmission/reception of data with the operation instrument;
an information reading unit reading information stored in the storage unit of the operation instrument through the second short distance radio communication unit; and
a processing unit performing processing in accordance with the read information read by the information reading unit and the operation information indicating operation for the operation instrument attached to the attachment unit, wherein
the information processing device has a power supply unit wirelessly supplying power to the operation instrument, and
the first short distance radio communication unit performs transmission/reception of data with the information processing device by the power supplied from the power supply unit.

22. An operation instrument attached to an attachment unit of an information processing device and used to accept operation concerning processing performed at the information processing device, comprising:
a storage unit storing information;
a first short distance radio communication unit performing transmission/reception of data with the information processing device, and
an indication part indicating processing performed at the information processing device in accordance with operation, wherein
the indication part is provided in a three-dimensional manner.

23. An information processing method used in an information processing device including an attachment unit to which an operation instrument to be operated by a user, having a storage unit storing information and a first short distance radio communication unit performing transmission/reception of data with an information processing device is attached, and including a second short distance radio communication unit performing transmission/reception of data with the operation instrument, comprising:
reading information stored in a storage unit of the operation instrument by the second short distance radio communication unit; and performing processing in accordance with read information and operation information indicating operation for the operation instrument attached to the attachment unit, wherein the information processing device has a power supply unit wirelessly supplying power to the operation instrument, and the first short distance radio communication unit performs transmission/reception of data with the information processing device by the power supplied from the power supply unit.

24. An information processing system, comprising:

an operation instrument to be operated by a user, having a storage unit storing information and a first short distance radio communication unit performing transmission/reception of data with an information processing device; and an information processing device having an attachment unit to which the operation instrument is attached, a second short distance radio communication unit performing transmission/reception of data with the operation instrument, an information reading unit reading information stored in the storage unit of the operation instrument through the second short distance radio communication unit, and a processing unit performing processing in accordance with read information read by the information reading unit and operation information indicating operation for the operation instrument attached to the attachment unit, wherein the storage unit is so configured that information in the storage unit is rewritable.

25. An information processing system, comprising:

an operation instrument to be operated by a user, having a storage unit storing information and a first short distance radio communication unit performing transmission/reception of data with an information processing device; and an information processing device having an attachment unit to which the operation instrument is attached, a second short distance radio communication unit performing transmission/reception of data with the operation instrument, an information reading unit reading information stored in the storage unit of the operation instrument through the second short distance radio communication unit, and a processing unit performing processing in accordance with read information read by the information reading unit and operation information indicating operation for the operation instrument attached to the attachment unit, wherein the operation instrument has an indication part indicating processing performed by the information processing device in accordance with operation.

* * * * *